United States Patent
Odegård et al.

[11] 3,977,181
[45] Aug. 31, 1976

[54] LINKING MEMBERS FOR CONNECTING A ROPE AND A CHAIN

[75] Inventors: Knut Hilmar Odegård; Ivar Krogstad, both of Arendal, Norway

[73] Assignee: A/S Pusnes Mekaniske Verksted, Arendal, Norway

[22] Filed: Mar. 19, 1975

[21] Appl. No.: 559,774

[30] Foreign Application Priority Data
Mar. 21, 1974   Norway............................... 1010/74

[52] U.S. Cl............................... 59/93; 24/265 EE; 114/206 R
[51] Int. Cl.[2]......................................... F16G 13/18
[58] Field of Search ..................... 59/93, 86, 95, 78; 294/78 R; 24/265 EE; 114/206 R, 235 R, 235 A; 403/57, 53, 54

[56] References Cited
UNITED STATES PATENTS

| | | | |
|---|---|---|---|
| 2,275,162 | 3/1942 | Sutthoff | 294/78 R |
| 3,264,017 | 8/1966 | Lagarde | 24/265 EE |
| 3,842,776 | 10/1974 | Wudtke | 114/206 R |

FOREIGN PATENTS OR APPLICATIONS
24,147   10/1896   United Kingdom.................... 59/95

*Primary Examiner*—C.W. Lanham
*Assistant Examiner*—Gene P. Crosby
*Attorney, Agent, or Firm*—Watson, Cole, Grindle & Watson

[57] ABSTRACT

The invention relates to a linking member for connecting a rope and a chain to provide a combined line, e.g. for use as a mooring line for semi-submersible drilling rigs. The linking member comprises a shell, an intermediate member pivotably mounted within the shell, and a rope attachment sleeve pivotably mounted in the intermediate member, the rope extending from the sleeve out of one end of the shell. Moreover, the shell is constructed at its other end with a loop or bar for engagement with the first link of the chain.

6 Claims, 9 Drawing Figures

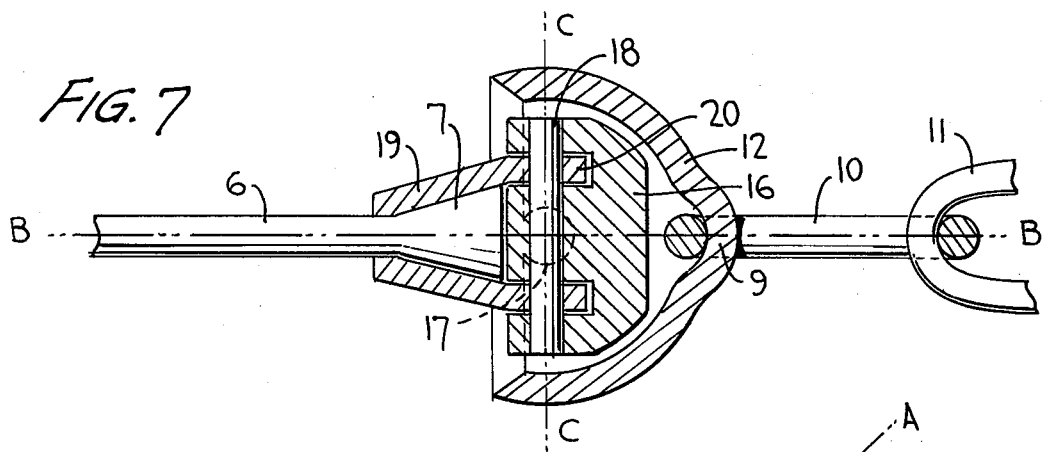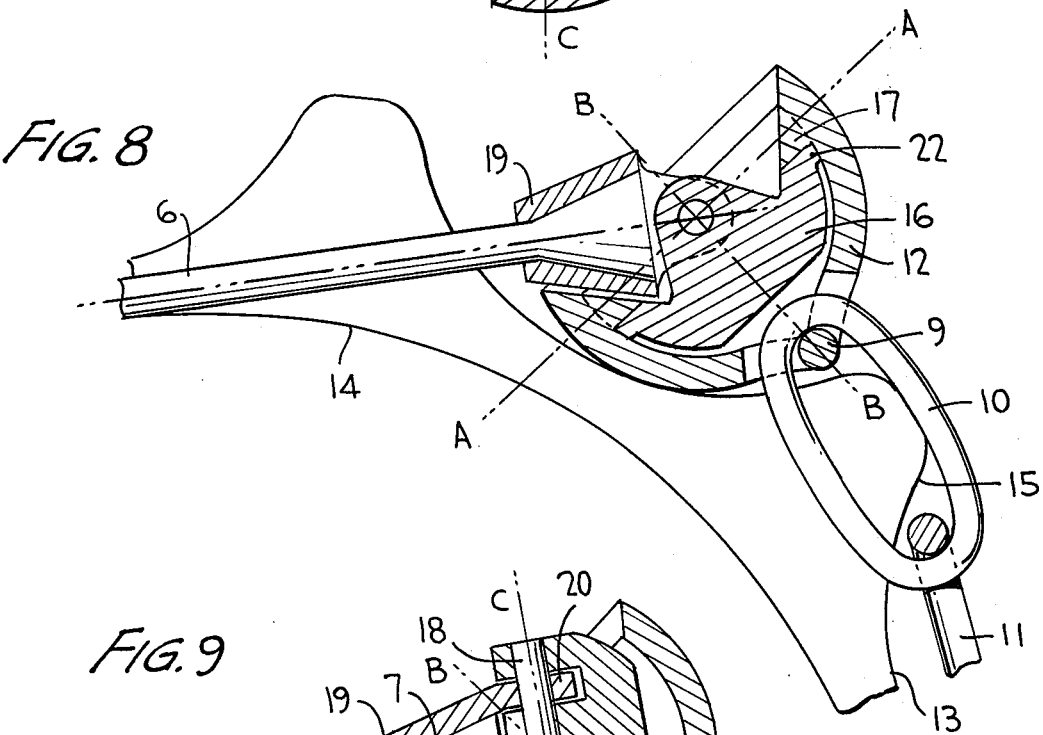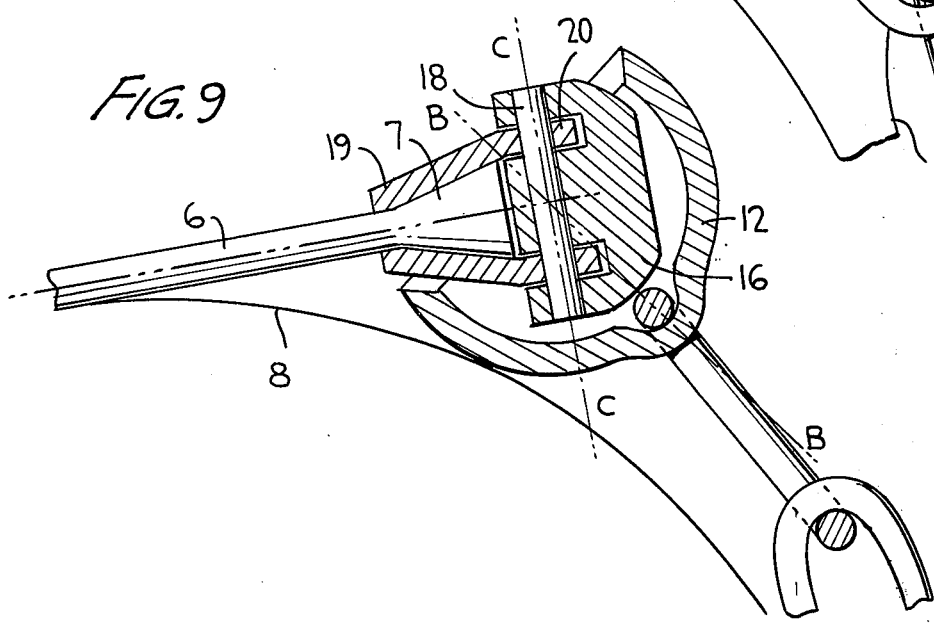

LINKING MEMBERS FOR CONNECTING A ROPE AND A CHAIN

BACKGROUND OF THE INVENTION

This invention relates to a linking member for connecting a rope and a chain. An important use of a line consisting of a rope and a chain connected through such a link is for the anchoring or mooring of offshore drilling rigs or vessels, particularly semi-submersible drilling rigs operating at moderate or great sea depths.

Though the advantages of this type of mooring line are generally recognized by experts — the chain part of the line permitting vertical movement of the drilling rig or vessel under the influence of even high waves without over-stressing of the line, the rope part limiting horizontal displacement — it is still more usual to employ either a chain alone or a rope alone. The reason for this is the lack of a satisfactory linking member suitable for passing across the fairleads or sheaves required for guiding the line during haul-in and pay-out without subjecting the rope to undue bending stresses at its point of connection to the linking member. It has been attempted to overcome this difficulty by stowing the chain on a service vessel from which the chain is connected to the rope outside the drilling rig or main vessel when the rope is paid out from the latter, but this method is time consuming, expensive and dangerous.

A connecting link has been proposed consisting of a linking body having a portion formed as a spherical segment, which linking body is rigidly attached to the rope while the chain is connected with the said body in such a manner as to be capable within certain limits of swinging freely in all directions about its point of attack, which is located at the center of the sphere. In ideal circumstances the effect of this arrangement would be that the chain would exert no moment of rotation on the linking body which would therefore orient itself in the direction of the rope and consequently would not subject the rope to bending stresses at its point of attachment. In practice, however, the rope in orienting the linking body will have to overcome the friction of that body against the fairlead or sheave across which it is being hauled, and besides the chain, engaging a bar or loop fast with the linking body, will not always be directed accurately towards the center of the sphere. Consequently, a certain blend may still be produced at the point of attachment of the rope, and such a bend, which will continually vary in magnitude and direction during use, may cause injury to the rope. Moreover, the possible angle between the rope and the chain is rather limited so that it will often be necessary to provide an external path for supporting the linking member, which tends to make the line guiding structure, such as an outboard bracket carrying fairleads or sheaves, bulky and heavy.

SUMMARY OF THE INVENTION

It is the object of the invention to provide a linking member which has improved properties in the respects mentioned. According to the invention, a linking member for connecting a rope secured in a sleeve and a chain comprises a shell, the outer surface of which is rotationally symmetric about a longitudinal axis, said shell being provided at one end thereof with means for the attachment of the chain and being constructed at its other end with an opening for the free passage of the rope, an intermediate member being mounted in the interior of said shell for rotation about a first transverse axis perpendicular to the longitudinal axis of the shell, said sleeve being mounted in said intermediate member for rotation about a second transverse axis perpendicular to said first transverse axis and to the longitudinal axis of a rope secured in said sleeve.

In such a linking member, the rope attachment sleeve is free to rotate in all directions relative to the shell so that no moment of rotation can be transferred to the rope to produce a bend at its point of attachment, no matter the direction of pull exerted by the chain. The chain may therefore be connected to the shell at its front end, which will permit it to deviate considerably more from the longitudinal axis of the linking member than in the known linking member mentioned above. Since also the rope may deviate from that axis within wide limits, the total angle between the rope and the chain may be very considerable, so that the linking member may pass smoothly across line guiding fairleads of sheaves of relatively small diameter, the rope and the chain extending tangentially to the guiding surface of said fairleads or sheaves.

BRIEF DESCRIPTION OF THE DRAWINGS

FIG. 7 is a longitudinal section at right angles to that of FIG. 5,

FIG. 8 is a longitudinal section corresponding to FIG. 1, illustrating the passage of the linking member across a pocketed sheave for the rope and the chain.

FIG. 9 is a similar section corresponding to the longitudinal section of FIG. 7, the sheave being illustrated as being smooth in this case.

DESCRIPTION OF THE PREFERRED EMBODIMENT

Figure 1:
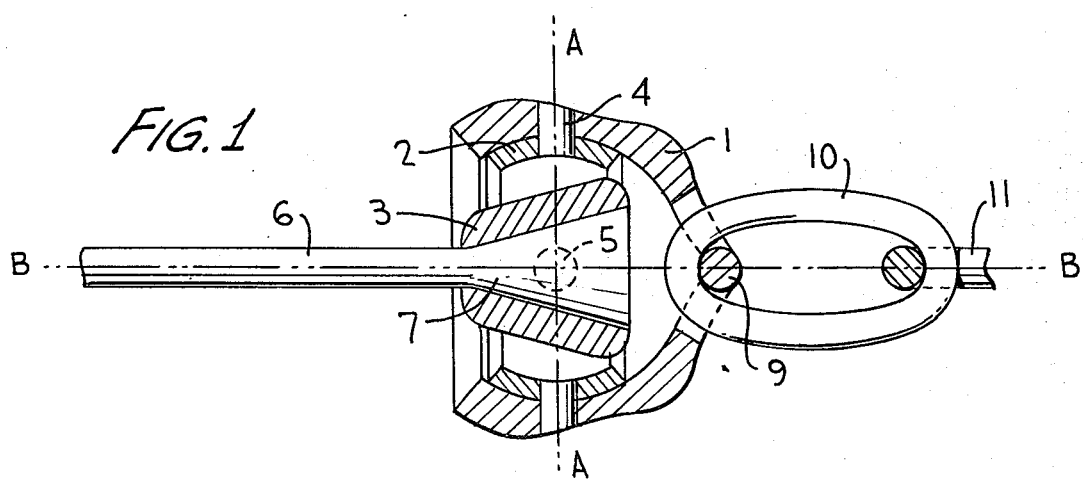
FIG. 1 is a longitudinal section through a linking member connecting a rope and a chain in accordance with one embodiment of the invention.
Figure 2:
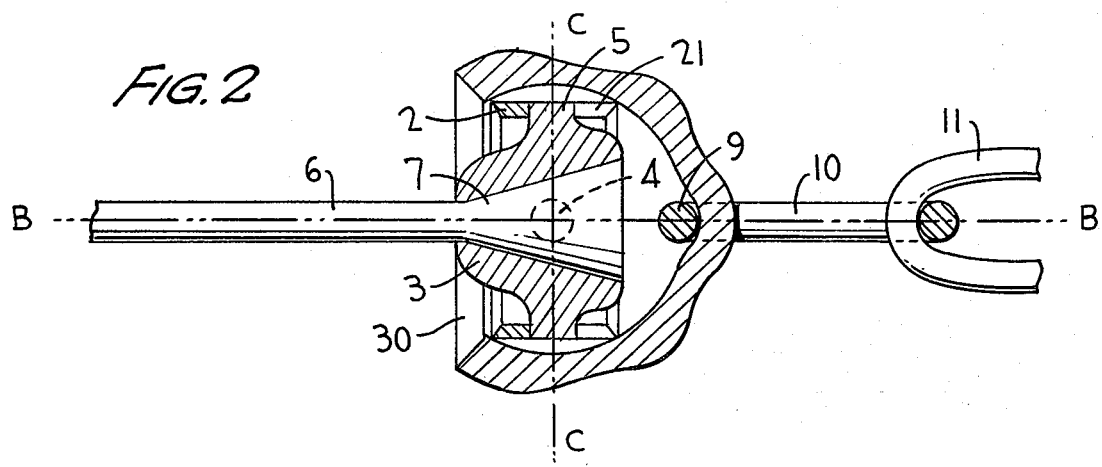
FIG. 2 is a longitudinal section at right angles to that of FIG. 1.

In the embodiment illustrated in FIGS. 1–4, 1 is a shell, the outer surface of which is rotationally symmetric about an axis B—B. An intermediate member 2 is mounted for rotation within the shell about an axis A—A by means of pins 4 extending through bores of the shell and the intermediate member and secured in either. A rope 6, which is usually a wire rope or a synthetic fibre rope, is secured in a conical sleeve 3, which is mounted for rotation within the intermediate member about an axis C—C by means of pins 5 which are integral with the sleeve and extend into bores of the intermediate member. The securing of the rope takes place in conventional manner by widening the end portion 7 of the rope and pouring in a moulding material. As illustrated in FIG. 2, the bores of the intermediate member 2 are extended to form open-ended slots 21, through which the pins or pivots 5 may be introduced before the intermediate member is mounted in the shell 1. A chain attachment bar or loop 9 is formed integrally with the shell and is engaged by the first link 10 of a chain. 11 is the second link of the chain which is perpendicular to the first one.

Figure 3:
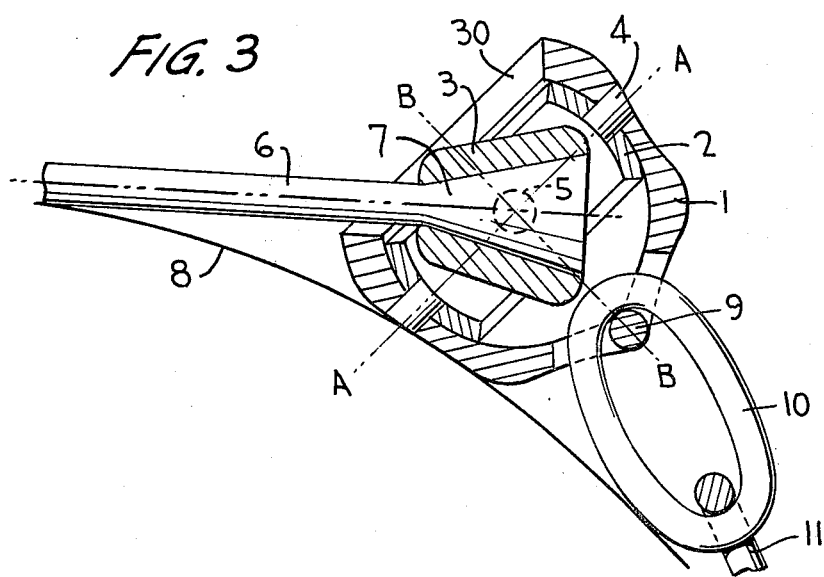
FIG. 3 is a longitudinal section corresponding to FIG. 1 and illustrating the passage of the linking member across a guiding sheave for the rope and the chain.

In FIG. 3 the parts are illustrated in the situation where the linking member passes across a guiding sheave 8 for the rope 6 and the chain 10, 11, the first link 10 of the chain being oriented "vertically" (as this orientation is called in the terminology of the art), i.e. perpendicularly to the axis of the sheave 8, the second link 11 being oriented "horizontally". Thus, the section of FIG. 3 corresponds to that of FIG. 1, the sleeve having turned about the axis C—C, while the intermediate member 2 has not turned about the axis A—A.

Figure 4:
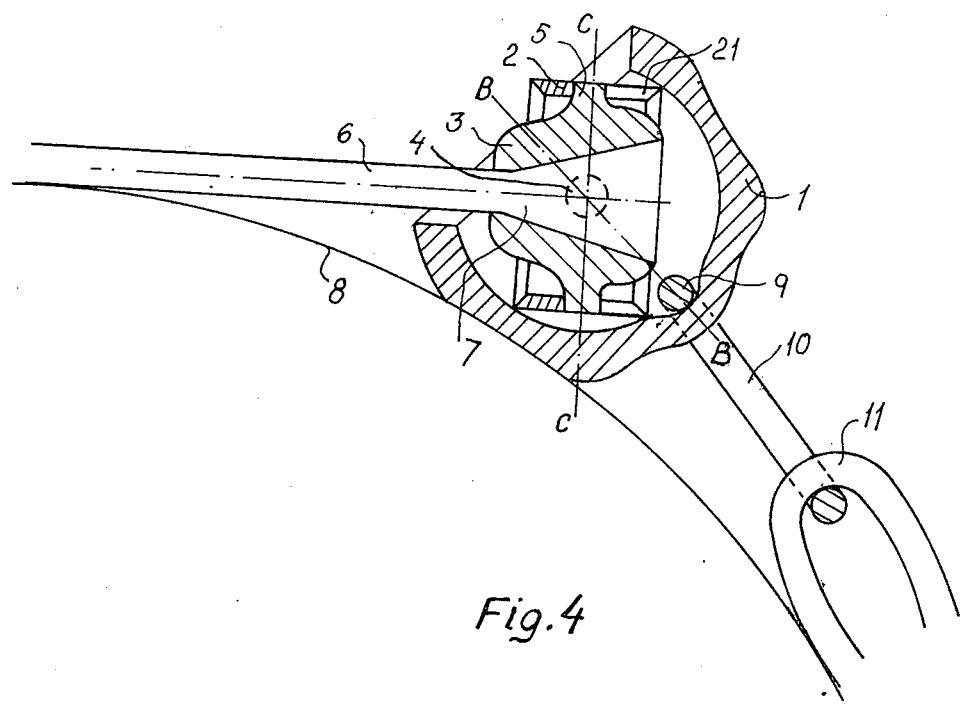
FIG. 4 is a similar illustration corresponding to the longitudinal section of FIG. 2.
Figure 5:
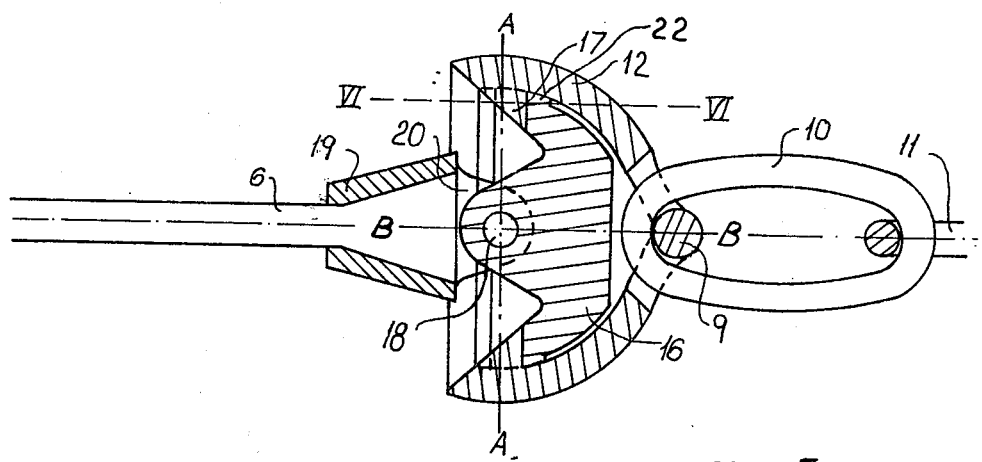
FIG. 5 is a longitudinal section through a linking member connecting a rope and a chain in accordance with a second embodiment of the invention.

Similarly the section of FIG. 4 corresponds to that of FIG. 2 and illustrates the situation where the linking member passes across the sheave 8 with the first link 10 in horizontal and the second link 11 in vertical position. In this case, the intermediate member 2 has turned about the axis A—A, while the sleeve 3 has not turned about the axis C—C. In practice, the orientation of the shell 1 about its axis B—B will most frequently be somewhere between the positions illustrated in FIGS. 3 and 4, depending on the angular position in which the chain approaches the sheave, and further tilting about the longitudinal axis may take place, when the chain engages the surface of the sheave 8, tending towards a position where the links of the chain are oriented at 45° relative to the axis of the sheave. The angular position of the chain about its longitudinal axis in each individual case is unimportant. The bar or loop 9 could therefore equally well extend perpendicularly to the position illustrated in the Figures or at any other angle. The outer shape of the shell 1 illustrated in FIGS. 1–4, engaging the sheave at both ends, is advantageous when the linking member only has to pass across smooth sheaves, because it permits the chain to swing relative to the shell in addition to the swinging of the sleeve 3 at the rope end.

As will be seen, the opening 30 of the shell 1, through which the rope extends, has a relatively large diameter permitting the rope to deviate considerably from the longitudinal axis B—B of the shell 1. Besides the sleeve has been so constructed that it will never engage the shell 1 so that the opening 30 of the shell only has to give clearance for the rope 6, but not for the sleeve.

Figure 6:
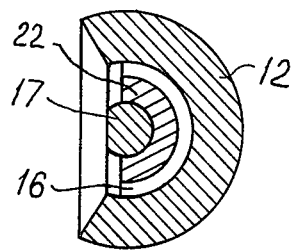
FIG. 6 is a section along the line VI—VI in FIG. 5.

In the embodiment illustrated in FIGS. 5–9, the shell 12 is of spherical configuration, fitting in the pockets 13 of a chain sheave 14. Alternatively, it might be egg-shaped in a direction towards its chain attachment. In the position of the parts illustrated in FIG. 8 the rope 6 extends tangentially to the bottom of a groove of the chain sheave which may be the same as that in which the vertical chain links are received, normally out of contact with its bottom. The first chain link 10 is vertical and is received between two teeth 15 of the chain sheave 14. In this embodiment the intermediate member 16 is rotatably mounted on two pivots 17 which are cast integrally with the shell 12. The sleeve 19 is rotatably mounted in the intermediate member 16 by means of a pin 18 extending through bores of the intermediate member and lugs 20 carried by the sleeve 19. The intermediate member 16 is constructed with bearing portions 22 engaging the pivots 17 as illustrated in FIG. 6, the bearing portions 22 being arcuate and extending over an angle 180° or less so that the bearing portions may be treaded on the pivots 17 and turned about the pivots to the position illustrated in FIG. 6. Owing to this special arrangement, the linking member is particularly easy to assemble and disassemble. Thus, for disassembling the linking member, the pin 18 is first pulled out after a suitable locking member, not shown, has been removed. The rope 6 and the sleeve 19 may now be removed from the intermediate member 20, whereafter this can be turned around the pivots 17 until it becomes free and can be withdrawn. Assembling of the linking member is performed in the reverse order. The pin 18 can be made relatively thin because it has four shearing sections, and the relatively great distance between the attachment of the rope in the sleeve 19 and the center of rotation within the shell has the effect that the bending angle of the rope necessary for turning the sleeve about the center of rotation will be extremely small.

We claim:

1. A linking member for connecting a rope secured in a sleeve and a chain, comprising a shell, the outer surface of which has the geometrical shape of a solid of revolution having a longitudinal axis, said shell being provided at one end thereof with means for the linking engagement of a link of the chain and being constructed at its other end with an opening for the free passage of the rope, an intermediate member being mounted in the interior of said shell by journalling means remote from said longitudinal axis for rotation about a first transverse axis perpendicular to the longitudinal axis of the shell, said sleeve being mounted in said intermediate member for rotation about a second transverse axis extending between said journalling means perpendicularly to said first transverse axis and to the longitudinal axis of a rope secured in said sleeve.

2. A linking member as in claim 1, in which said shell is formed with pins or pivots integral therewith, and said intermediate member is constructed with bearing portions for engagement with said pins or pivots, said bearing portions being arcuate and extending over an angle of 180° or less, so that in assembling the linking member said bearing portions may be treaded on said pins or pivots and turned to a position behind same, said intermediate member and said sleeve being rotatably connected by means of a pin extending through said intermediate member and through lugs carried by said sleeve, said sleeve being located outwardly of said pin.

3. A linking member as in claim 1, in which said shell is ball- or egg-shaped in a direction towards its chain engagement end so as to fit into the pockets of a chain sheave.

4. A linking member as in claim 1, in which said means for the linking engagement of a link of the chain consists of a rib extending across an end opening of said shell.

5. A linking member as in claim 1, in which said shell and said intermediate member have bores for outer pins, and said sleeve has radially extending inner pins engageable in other bores of said intermediate member, said other bores being extended to form open-ended slots for the introduction of said inner pins in assembling the linking member.

6. A linking member as in claim 2, in which the relative arrangement and dimensions of said shell and said sleeve are such that said sleeve, when turning about the axis of said inner pins will never contact said shell.

* * * * *